F. E. IVES.
TRICHROMATIC PHOTOGRAPHIC APPARATUS.
APPLICATION FILED OCT. 18, 1909.
980,961.
Patented Jan. 10, 1911.
2 SHEETS—SHEET 2.
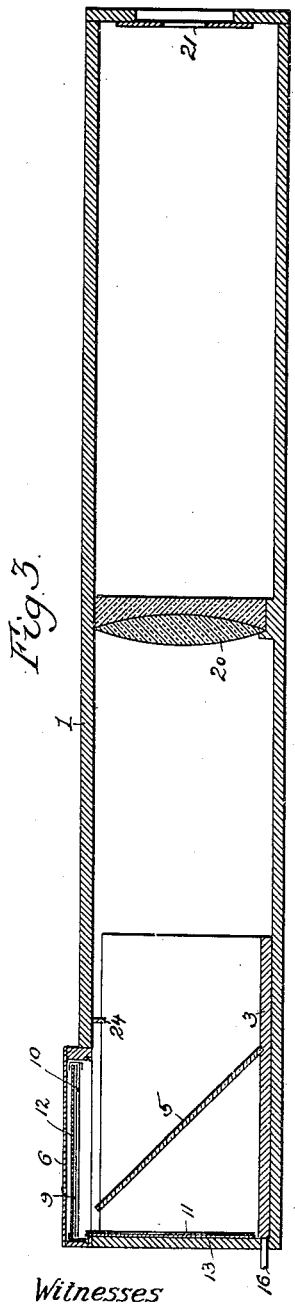
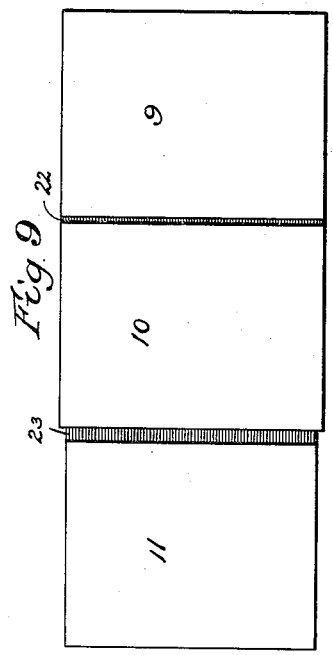
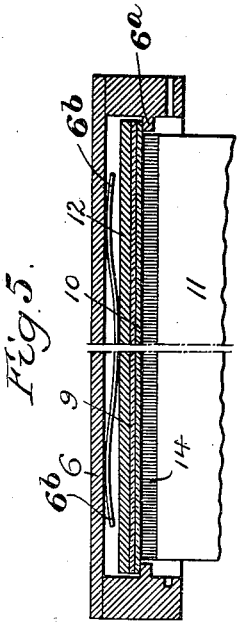
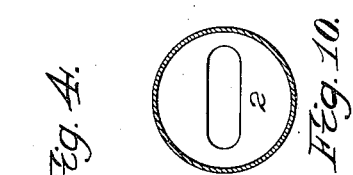
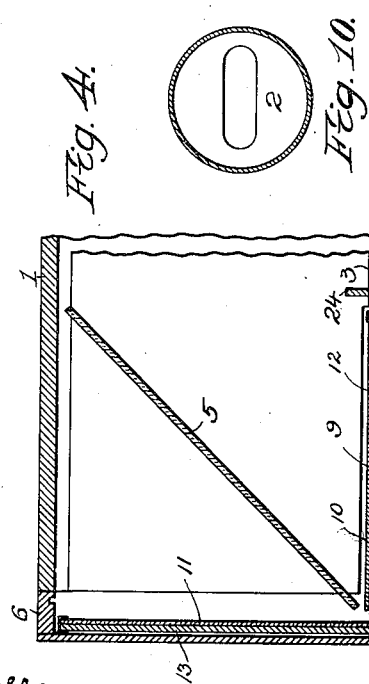
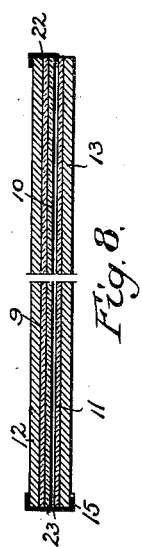
Witnesses
H. L. Smith
Hamilton D. Turner
Inventor
Frederic E. Ives
by his Attorneys
Smith

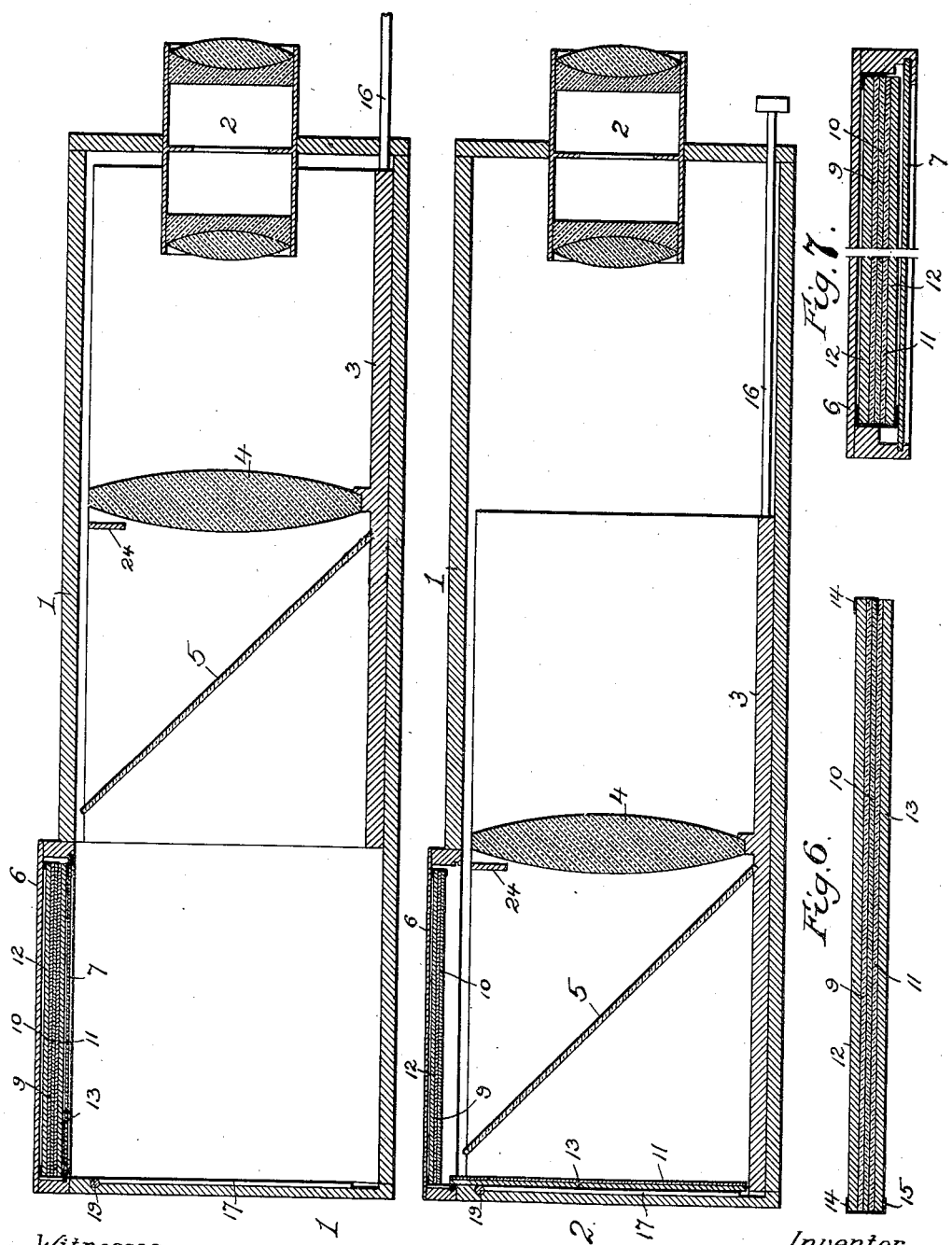

UNITED STATES PATENT OFFICE.

FREDERIC E. IVES, OF WEEHAWKEN, NEW JERSEY.

TRICHROMATIC PHOTOGRAPHIC APPARATUS.

980,961.  Specification of Letters Patent. Patented Jan. 10, 1911.

Application filed October 18, 1909. Serial No. 523,186.

*To all whom it may concern:*

Be it known that I, FREDERIC E. IVES, a citizen of the United States, residing in Woodcliffe-on-Hudson, Weehawken, New Jersey, have invented certain Improvements in Trichromatic Photographic Apparatus, of which the following is a specification.

The object of my invention is to simplify the production, by a single exposure, of the three separate color record negatives required for certain forms of the trichromatic process of photography.

My invention relates especially to that method in which the three sensitive plates, each corresponding to its respective color sensation, are combined in the form of a pack.

In the accompanying drawings—Figure 1 is a vertical longitudinal section of a sensitive plate pack and camera constructed in accordance with my invention, the parts occupying the positions assumed by them when the plate holder is first applied to the camera; Fig. 2 is a similar view representing the relation of the parts to one another when the exposure is being made; Figs. 3 and 4 are vertical longitudinal sections illustrating certain modifications of my invention; Fig. 5 is a transverse section through the plate holder, showing the plates in the position assumed when the exposure is being made; Figs. 6, 7, 8, and 9 are views illustrating different forms of sensitive plate pack in accordance with my invention, Figs. 6, 7 and 8 being on an enlarged scale, and Fig. 10 is a transverse section of the lens tube illustrating a special form of lens aperture.

Referring in the first instance to Figs. 1 and 2 of the drawings, 1 represents the casing of the camera, and 2 is the objective lens which may be provided with focusing attachments of an ordinary character. A sliding base-plate 3, located within the camera, carries a lens 4, and a transparent reflector 5 disposed at an angle of 45°. A plate-holder 6 of ordinary construction, provided with a sliding shutter 7 is fitted to an aperture in the top of the camera in any convenient way. This plate-holder carries the sensitive plate pack which comprises the three sensitive plates 9, 10 and 11, the green sensitive plate 9 being at the back of the holder with its film side down, the blue sensitive plate 10 being disposed with its film side up and in contact with the film side of the green sensitive plate 9, and the red sensitive plate 11 being also disposed film side up with its film in contact with the back of the blue sensitive plate 10.

By preference, the green sensitive plate 9 has a light proof backing 12 and the red sensitive plate 11 has a similar light proof backing 13, whereby the sensitive surfaces are all shielded from exposure to light when putting the pack in or taking it out of the holder and during the transportation of the pack from place to place. Strips 14 bind together the blue and green sensitive plates at one edge, and the three plates at the opposite edge, the latter strip also providing a flexible hinge 15 for the face plate 11, which is narrower than the other plates, the front and side edges of said plate 11 being, therefore, free from confinement but said plate being normally held in its proper relation to the other plates by the sliding shutter 7 of the plate-holder after the pack has been inserted in the holder. The plates 9 and 10 may therefore be said to constitute one member of the pack and the plate 11 another member hinged to the first.

The side portions of the member comprising the plates 9 and 10, when the pack is laid in the holder, rest upon suitable ledges 6ª therein, and may be held against the same by a suitable spring 6ᵇ on the back plate of the holder as shown in Fig. 5.

Either before or after the application of the plate-holder to the camera the slide 3 is drawn forward by any suitable means, as for instance, by a rod 16 passing through an opening in the front of the camera, whereby, when the sliding shutter 7 of the plate holder is withdrawn, the plate 11 will drop down into contact with the back of the camera, as shown in Fig. 2, and the slide 3 is then pushed inward so as to bring the lens 4 into proper relation to the objective lens 2 and locate the diagonally disposed transparent mirror 5 below the plates 9 and 10 contained in the holder, and in front of the plate 11 which lies against the back of the camera.

After the exposure has been made the slide 3 is drawn forward and the plate 11 can then be swung up into its proper relation to the other member of the pack either by means of an arm 17 located at the back of the camera and carried by a rock shaft 19 accessible from the outside of the camera, or by tilting the camera so as to cause said plate 11 to swing by gravity to its proper position in the holder, the sliding shutter 7 being then re-applied to the holder so as to properly retain the plates therein.

The transparent reflector 5 serves to divide the light rays in order to form two separate images, one for the blue and green sensitive plates in the holder and the other for the red sensitive plate at a right angle thereto, and this transparent reflector may be of a red color, in order to render unnecessary the application of any color screen to the red sensitive plate 11.

The purpose of the lens 4 is to approximately parallelize the diverging cone of rays from the objective lens 2, and thereby correct or minimize the distortion incident to refraction at various angles through an inclined transparent reflector and also to equalize the color absorption and percentage of reflection from top to bottom of the reflector. In the absence of this lens there would, because of the different angles of incidence, be considerably more reflected light and correspondingly less transmitted light toward the edge of the reflector farthest removed from the objective lens.

In order to prevent any light from the lens aperture from reaching, directly, any part of the faces of the horizontal plates, I may use a diaphragm strip 24 for partially shielding the lens 4.

The relation of the parts as shown in Figs. 1 to 4 involves the loss of a small portion of each plate 9 and 10, by reason of the reflector 5 not extending to the edges of these plates.

With the plates hinged as shown, the image at the upper portion of the plate 11 would also be imperfect because of the cutting off of light by the diaphragm strip 24. In order to minimize this loss, without proportionately increasing the time of exposure, I prefer to employ a horizontally elongated lens aperture, as shown in Fig. 10. The vertical position of the plate 11, however, and its relation to the image projected by the lens is dependent upon the width of the hinge strip whereby said plate is connected to the plates 9 and 10.

The sensitive plates may be prepared in accordance with my Letters Patent No. 927,244, dated July 6th, 1909, although perfect transparency of the blue sensitive plate is not absolutely necessary.

The compensating lens 4 so supplements the objective lens 2 as to virtually shorten its focus, making it substantially equivalent to a lens of the same actual aperture and of focal length equal to the distance from the objective lens to the compensating lens when adapted to form sharp images on the sensitive plates. The objective lens 2 must therefore be of longer focus to occupy a given position when the compensating lens is in place than it would be in the absence of such compensating lens. It is possible, however, to substitute for the combination of objective lens and compensating lens shown in Figs. 1 and 2 a single achromatic lens of the diameter of the image of the object to be photographed, with a diaphragm placed at its focal length in front of it, such construction being illustrated in Fig. 3, in which 20 represents such achromatic lens and 21 the diaphragm. This camera, however, would be more cumbersome than that shown in Figs. 1 and 2, and the lens would be expensive, except in small sizes.

It is not necessary to rigidly adhere to the conditions set forth in order to obtain good results, but they represent the most desirable conditions.

In that embodiment of my invention shown in Fig. 4, the plate holder is at the rear end of the camera and retains the red sensitive plate 11, preferably by frictional contact of the sides of the plate holder with the edges of the flute, the member comprising the blue and green sensitive plates dropping down onto the bottom of the camera in order to effect their exposure, and the diagonal transparent mirror 5 occupying a reverse angle to that illustrated in Figs. 1 and 2. The separation and re-assembling of the members of the pack may be effected either by tilting the camera or by means of a swinging arm similar to that shown in Fig. 1, if desired.

All of the plates may, if desired, be of the same size, as shown in Fig. 7, the member comprising the blue and green sensitive plates being retained in the holder by frictional contact of the walls of the latter with the edges of the plates.

A preferable method of constructing the pack is to bind together the back and intermediate plates 9 and 10, as shown at 22 in Figs. 8 and 9, and to bind together the edges of the back and face plates at the other side of the pack, as shown at 23 in said figures, as this not only provides a hinged connection between the member comprising the plate 11 and the member comprising the plates 9 and 10 but also a hinged connection between the latter plates, and thus permits the plates to spread out side by side, face up, when the pack is removed from the holder, the three plates being placed in the developing tray in this position and the connecting strips being loosened by the developing solution so as to render it unnecessary to cut said strips before proceeding with the development of the plates.

I claim:

1. A trichromatic process sensitive plate pack comprising three color sensitive plates constituting members which are normally held in overlying relation by a binding strip at one edge, said binding strip being flexible whereby it constitutes a hinge which permits one member of the pack to swing outwardly in respect to the other.

2. A trichromatic process sensitive plate pack comprising three color sensitive plates constituting members which are normally held in overlying relation by a binding strip at one edge, said binding strip being flexible whereby it constitutes a hinge which permits one member of the pack to swing outwardly in respect to the other, one member of the pack being of lesser dimensions than the other whereby the latter may engage with a retainer without restricting the swinging movement of the first member.

3. A trichromatic process sensitive plate pack comprising three color sensitive plates constituting members held normally in overlying relation by binding strips so as to be conveniently handled as a unit, and having at one edge a flexible binding strip which constitutes a hinge whereby one member of the pack may swing outwardly in respect to the other.

4. A trichromatic process sensitive plate pack comprising three color sensitive plates constituting members held normally in overlying relation by binding strips so as to be conveniently handled as a unit, and having at one edge a flexible binding strip which constitutes a hinge whereby one member of the pack may swing outwardly in respect to the other, one member of the pack being of lesser dimensions than the other whereby the latter member can be retained by engagement with the holder without interfering with the swinging movement of the first member.

5. A trichromatic process sensitive plate pack comprising three color sensitive plates constituting members which are normally held in overlying relation by means of a binding strip at one edge, said binding strip being flexible so as to constitute a hinge whereby one member can swing in respect to the other, in combination with a holder for said pack having portions for engaging and retaining one member of the same while permitting the swinging movement of the other member.

6. A trichromatic process sensitive plate pack comprising three color sensitive plates constituting members which are normally held in overlying relation by means of a binding strip at one edge, said binding strip being flexible so as to constitute a hinge whereby one member of the pack can swing in respect to the other, said swinging member being of lesser dimensions than the other, in combination with a holder for said plate pack having means for overlapping and retaining the larger member of the pack while permitting swinging movement of the smaller member.

7. A trichromatic process sensitive plate pack comprising three color sensitive plates and edge bindings, one of the latter constituting a flexible hinge for connecting one of the plates to another.

8. A trichromatic process sensitive plate pack comprising three color sensitive plates and edge bindings, which constitute flexible hinges for connecting the plates to one another.

9. A trichromatic process sensitive plate pack comprising three color-sensitive plates, and front and rear light-proof backings, one of said color-sensitive plates and a backing being together hinged to the others at one edge so that said plate and backing can be swung outwardly from the other plates and their backing.

10. A trichromatic process sensitive-plate pack comprising three plates sensitive respectively to red, green and blue color sensation and hinged together at their edges so that they can be spread out flat in series or can be folded directly one over another.

11. A trichromatic process sensitive-plate pack comprising three plates sensitive respectively to red, green and blue color sensation and hinged together at their edges so that they can be spread out flat in series with their sensitive faces up or can be folded directly one over another.

12. The combination of a trichromatic sensitive-plate pack comprising members pivotally connected to one another whereby one of said members can be caused to overlie the other or can be turned at an angle thereto, with a camera having a lens, a transparent reflector separate from the plate pack, and means for movably mounting said reflector in the camera whereby it can be interposed at an angle of forty-five degrees between the separated members of the plate pack or can be removed from such position so as to permit the folding of the hinged member of the plate pack over the other member of the same.

13. The combination of a trichromatic sensitive-plate pack comprising members pivoted together whereby one can be caused to overlie the other or can be turned at an angle thereto, with a camera having a movable slide therein provided with a transparent reflector disposed at an angle thereon, whereby it can be inserted between the separated members of the plate pack or can be withdrawn from such position.

14. The combination of a trichromatic sensitive-plate pack comprising members pivoted together so as to overlie one another or assume an angular relation to one another, with a camera having a slide carrying both a lens and an inclined transparent reflector, said slide being movable in the camera so as to cause the reflector to be interposed between the separated members of the plate-pack or to be withdrawn from such position.

15. In a camera for trichromatic process negative making, the combination of an objective lens, a plate holder, a film pack comprising members hinged together so that one can assume an angular relation to the other, an inclined transparent mirror, a compensating lens interposed between said mirror and the objective lens, and a movable mounting for said mirror and compensating lens whereby both are simultaneously adjusted to operative or inoperative position in respect to the film pack, the mirror, when in operative relation with said pack, serving to separate the rays and direct some of them to one member of the pack and others to the other member of the pack.

In testimony whereof, I have signed my name to this specification, in the presence of two subscribing witnesses.

FREDERIC E. IVES.

Witnesses:
  HAMILTON D. TURNER,
  KATE A. BEADLE.